De W. C. McDONALD.
Horse Hay-Forks.
No. 138,572.
Patented May 6, 1873.
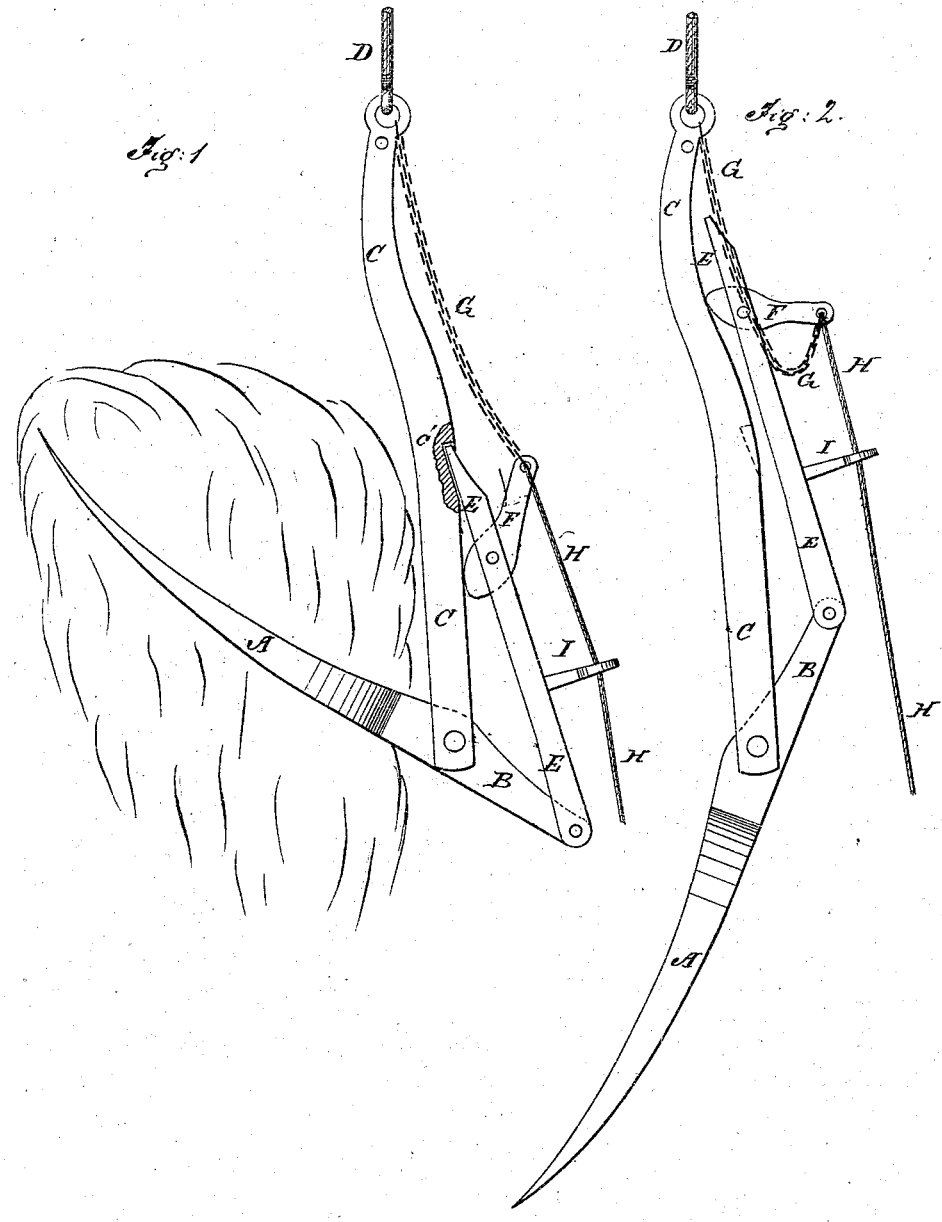

UNITED STATES PATENT OFFICE.

DE WITT C. McDONALD, OF RUSHFORD, NEW YORK.

IMPROVEMENT IN HORSE HAY-FORKS.

Specification forming part of Letters Patent No. 138,572, dated May 6, 1873; application filed March 22, 1873.

*To all whom it may concern:*

Be it known that I, DE WITT C. McDONALD, of Rushford, in the county of Allegany and State of New York, have invented a new and useful Improvement in Horse Hay-Fork, of which the following is a specification:

Figure 1 is a side view of my improved fork, the parts being shown in position for supporting the load. Fig. 2 is a side view of the same, the parts being shown in position for dumping the load.

Similar letters of reference indicate corresponding parts.

My invention has for its object to furnish an improved horse hay-fork, simple in construction, convenient in use, and effective in operation, holding the load securely and being readily operated to dump the said load. The invention consists in the horse hay-fork formed of the tines, two or three, the rigid shank, the pivoted draft-bar, the pivoted brace-bar, the pivoted trip-lever, the chain, and the trip-cord, constructed and arranged to operate in connection with each other, as hereinafter fully described.

A are the tines, two or three of which may be used, and which are formed solid upon the shank B. To the inner end of the shank B is pivoted the end of the draft-bar C, to the other end of which is attached the end of the hoisting-rope D. To the outer end of the shank B is pivoted the end of the brace-bar E, the other end of which is so formed as to enter and fit into a notch or mortise, $c'$, formed in the rear edge of the bar C to hold the fork-tines A in proper position for sustaining the load, as shown in Fig. 1. To the brace-bar E near its upper end is pivoted a short lever, F, the inner end of which is rounded off or made cam-shaped, so as when the said lever is operated to push the brace E out of the mortise $c'$ in the bar C and dump the fork. To the outer end of the trip-lever F is attached one end of a chain, G, the other end of which is attached to the end of the draft-bar C, and which is made of such a length that when the upper end of the bar C is moved forward to bring it into such a position that the end of the brace E can enter the mortise $c'$ of said bar C, the said chain G will bring the lever F into such a position that it will not interfere with the entrance of the said brace into the said mortise, and that it will be ready to trip the fork when desired. To the end of the trip-lever F is also attached the end of the trip-cord H, which passes through the eye of a guide-stud, I, attached to the brace E, and passes into such a position that it may be readily reached and operated to trip the fork.

Having thus described my invention, I claim as new and desire to secure by Letters Patent—

A horse hay-fork formed of the tines A, (two or three,) the rigid shank B, the pivoted draft-bar C provided with the notch $c'$, the pivoted brace-bar E, the trip-lever F pivoted to brace-bar, the chain G, and the trip-cord H, constructed and arranged to operate in connection with each other substantially as herein described.

DE WITT CLINTON McDONALD.

Witnesses:
 ALBERT WOODS,
 H. C. PELTON.